DIAL CONTROLLED REMOTE-TO-LOCAL EXCHANGE REPEATER
FOR A PRIVATE EXCHANGE
Filed Aug. 31, 1967
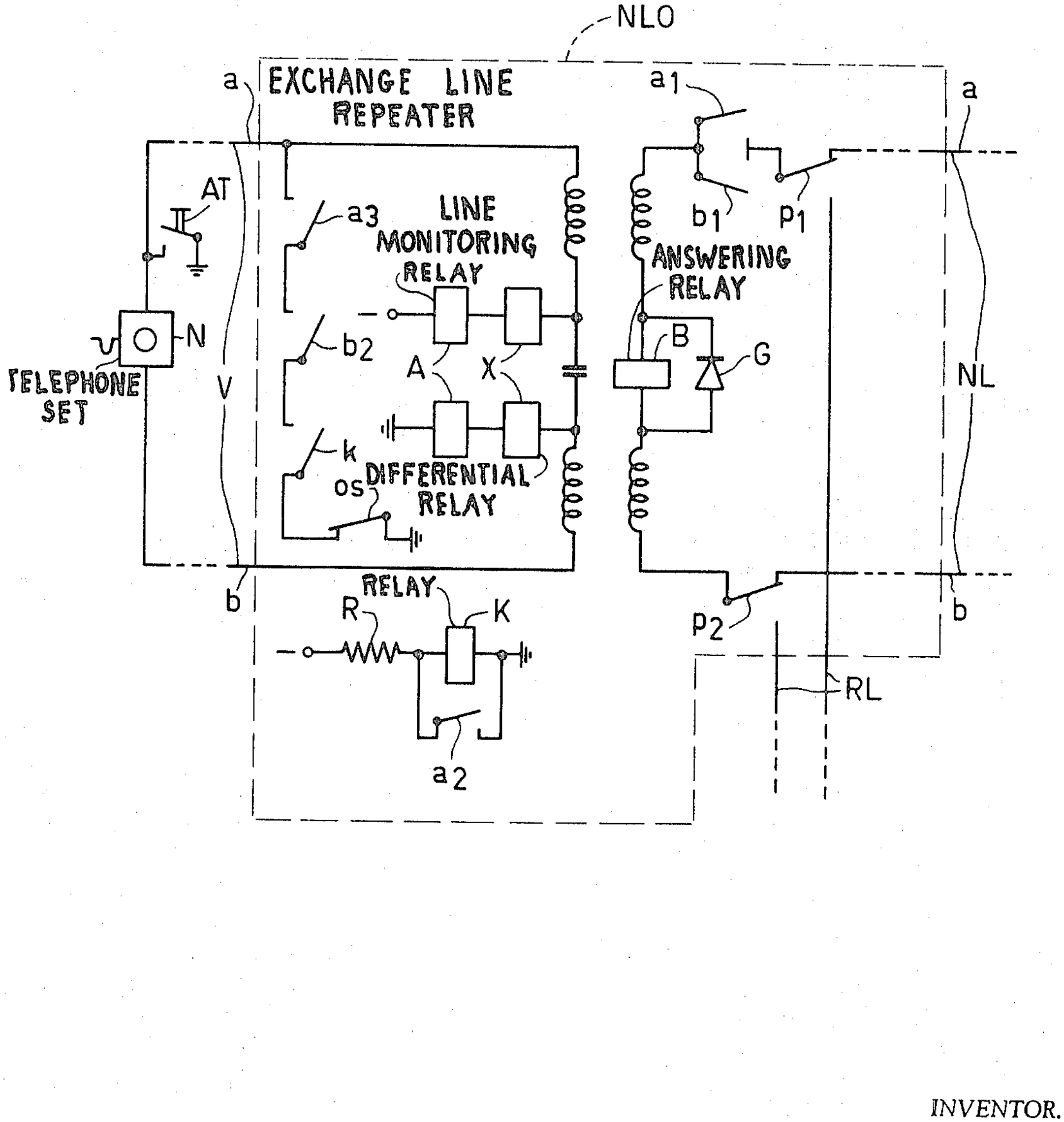
INVENTOR.
JOHANNES M. BROUWER
BY
Frank R. Trifari
AGENT United States Patent Office 3,538,260

Patented Nov. 3, 1970

3,538,260

DIAL CONTROLLED REMOTE-TO-LOCAL EXCHANGE REPEATER FOR A PRIVATE EXCHANGE

Johannes M. Brouwer, Hilversum, Netherlands, assignor to U.S. Philips Corporation, New York, N.Y., a corporation of Delaware Filed Aug. 31, 1967, Ser. No. 664,802
Claims priority, application Netherlands, Sept. 7, 1966, 6612569
Int. Cl. H04m 3/42
U.S. Cl. 179—16 5 Claims

ABSTRACT OF THE DISCLOSURE

A private automatic branch exchange employs an additional relay in order to enable a "call-back" connection to be established in response to a dialling pulse as well as operation of a grounding key. The call-back connection transfers a telephone set from external exchange lines to the local exchange lines.

The invention relates to an exchange line repeater for a private automatic branch exchange with a possibility of automatically reconnecting a phone to the internal private exchange lines, hereinafter referred to as calling back. The repeater comprises a line monitoring relay and a dfferential relay.

The conventional manner for calling back as disclosed in Philips Telecommunciations review, vol. 26, No. 2, April 1966. pp. 62–73, consists in depressing the ground key of a telephone apparatus for a short instant. This ground key connects the ground potential to one of the speech wires so that the differential relay in the exchange line repeater is switched on.

It is furthermore known to establish a call back by producing a loop interrupting pulse, for example, by dialling the digit 1.

The invention has for its object to provide an exchange line repeater of the type described above, which combines in a simple manner the two methods of calling back.

The change line repeater according to the invention is characterized in that it comprises a circuit of relay contacts controlled by the line monitoring relay and a following relay thereof, one side of said circuit being connected to one of the speech wires and the other side being connected to a point of constant potential so that at the reception of a loop interrupting pulse from a subscriber the speech wire concerned is transiently connected to the point of constant potential and the differential relay is transiently switched on.

This change line repeater has the advantage that by providing an earth key on a telephone set the production of a loop interrupting pulse from this telephone set may be utilized to switch on an existing connection. During call back this facility is particularly important in small, simplified private telephone exchanges, in which the exchange line connections enter the so-called night set. It is furthermore possible to use the loop interrupting pulse for adding on an internal extension that is called by night service extension in call-back operation, the subscriber called back to the exchange line connection (add on).

The invention will be described more fully with reference to an embodiment shown in the drawing.

The figure shows diagrammatically an exchange line repeater NLO of a private automatic branch exchange. The figure shows only the parts required for a good understanding of the invention. A telephone set N of a subscriber of the private exchange is connected through a connection path V, indicated by broken lines, to the exchange line repeater. The exchange line repeater comprises a line monitoring relay A, connected in known manner and a differential relay X. The repeater comprises furthermore an answering relay B, the winding of which is shunted by a rectifier G. The winding of this relay is connected between the wires of the exchange line. This relay is switched on when a speech connection is established from the public exchange by polarity inversion of the voltage supply. During a speech connection the relays A and B are switched on, whereas the relay X is switched off.

When the subscriber of the private exchange wants to make a call-back during an exchange line call, two possibilities are, in principle, available. If the subscriber has an earth key (AT) at his disposal he can initiate call-back by depressing and releasing the earth key. By depressing the earth key the differential relay X is switched on in known manner and after the release of the earth key it is switched off. After the differential relay X is switched off, the change-over contacts $p_1$ and $p_2$ are changed over in a manner not shown, so that the repeater of the exchange line NL is changed over to the call-back line RL. When a subscriber does not have an earth key at his disposal, he can dial the digit 1 to initiate the call-back connection. By dialling the digit 1 a loop interrupting pulse is produced, which switches off the line monitoring relay A. A contact $a_2$ of relay A is connected in parallel with the winding of a relay K, which winding is connected to earth and through a resistor R to the voltage supply. When the contact $a_2$ is opened after relay A is switched off, the relay K is switched on. After the loop interrupting pulse has ended, relay A is again switched on and relay K is switched off with a delay through the closed contact $a_2$. In the time interval between the instant, when relay A is switched on, and the instant, when relay K is switched off, the next-following current circuit is completed:

earth, $os$, $k$, $b_2$, $a_3$, $a$-wire

The $a$-wire is thus transiently connected to earth so that, as by the transient depression of the earth key, the repeater is changed over to the call-back line RL.

After the change-over of the repeater, the answering relay B is switched off by the polarity inversion of the voltage supply of the call-back line. The contact $b_1$ removes the short-circuit of the contact $a_1$ and the contact $b_2$ holds said current circuit open as long as relay B is switched off. The dialling pulse series for the establishment of the call-back connection does not produce a closure of said current circuit and are transferred by relay A with the contact $a_1$ to the call-back line. After the establishment of the call-back connection the answering relay B is again switched on by the polarity inversion of the supply voltage of the call-back line. The contact $b_1$ shunts the contact $a_1$ and the contact $b_2$ prepares the above-mentioned current circuit. When at the termination of the call-back the subscriber dials the digit 1, said current circuit is again completed for a short instant. As a result, the wire is transiently connected to earth, so that, like by the depression of an earth key, the repeater is switched back to the exchange line. The subscribers of the private exchange can make a call-back or get out of it by dialling the digit 1, and, if desired, also by flashing the receiver hook. With certain telephone sets, for example, the night set, it may be desired to permit a connection to an existing speech connection. This may be the case with small private exchanges not provided for economic reasons with an operator set and operator circuitry. The operator of the night set must then be able to announce an incoming exchange line connection by call-back, even if the subscriber called is occupied. The earth keys are reserved for the apparatus having a possibility of switching on. Switching on during call-back can then be performed by producing a loop interrupting pulse. When a set with a switch on facility is connected to the repeater, the contact *os* is opened. When the subscriber of an apparatus with switch on facility produces a loop interrupting pulse during call-back, the open contact *os* prevents the subscriber from getting out of the call-back. The ingression switch on dial pulse can be further processed in a manner not essential in this case.

What is claimed is:

1. An exchange line repeater for a private automatic branch exchange with a possibility of automatically switching an instrument from the main exchange to internal lines of the private exchange, hereinafter referred to as calling back, comprising a line monitoring relay and a differential relay, characterized in that the repeater comprises a circuit of relay contacts controlled by the line monitoring relay and a following relay thereof, one side of the circuit being connected to the speech wires and the other side being connected to a point of constant potential so that at the reception of a loop interrupting pulse from a subscriber the speech wire concerned is transiently connected to the point of constant potential and the differential relay is transiently switched on.

2. An exchange line repeater as claimed in claim 1 characterized in that the circuit of relay contacts includes a contact of a relay which interrupts said circuit during dialling.

3. An exchange line repeater as claimed in claim 1, characterized in that the circuit of relay contacts includes a contact of a relay which interrupts said circuit, when a telephone set having an earth key is connected.

4. An exchange line repeater for a private automatic branch exchange of the type having means interconnecting said repeater with a subscriber's set to form a loop circuit, a line monitoring relay connected to be energized only when said loop circuit is complete, and a differential relay connected to be energized only when a line of said loop circuit interconnecting said subscriber's set and repeater is connected to a point of constant potential, said differential relay being connected to establish call-back connections as hereinbefore defined; wherein the improvement comprises a series circuit of a plurality of relay contacts connected between said one line of said loop circuit and said point of constant potential, a following relay having contact means, means connecting said following relay whereby said contact means are closed when said line monitoring relay is deenergized, and open with a delay when said line monitoring relay is energized, one of said plurality of relay contacts being said contacts means, another of said plurality of relay contacts being normally open contacts of said line monitoring relay, whereby said one line is connected to said point upon momentary interruption of said loop circuit.

5. The repeater of claim 4 in which said repeater is of the type having an answering relay which is energized only when a speech connection is established between said repeater and another line, wherein still another of said plurality of relay contacts is a normally open contact of said answering relay, whereby said one line is not connected to said point when said subscriber's set is dialling.

References Cited

UNITED STATES PATENTS

| | | | |
|---|---|---|---|
| 1,651,017 | 11/1927 | Deakin | 179—17 |
| 1,912,453 | 6/1933 | Hovland | 179—17 |
| 2,117,488 | 5/1938 | Lomax et al. | 179—18 |
| 2,289,505 | 7/1942 | Kuchley | 179—17 |
| 2,422,565 | 6/1947 | Powell | 179—18 |
| 3,014,097 | 12/1961 | Apt. | |

KATHLEEN H. CLAFFY, Primary Examiner

J. S. BLACK, Assistant Examiner